July 19, 1932.    C. J. DUNZWEILER    1,867,735
BATTERY HOLDDOWN
Filed May 27, 1929    2 Sheets-Sheet 2

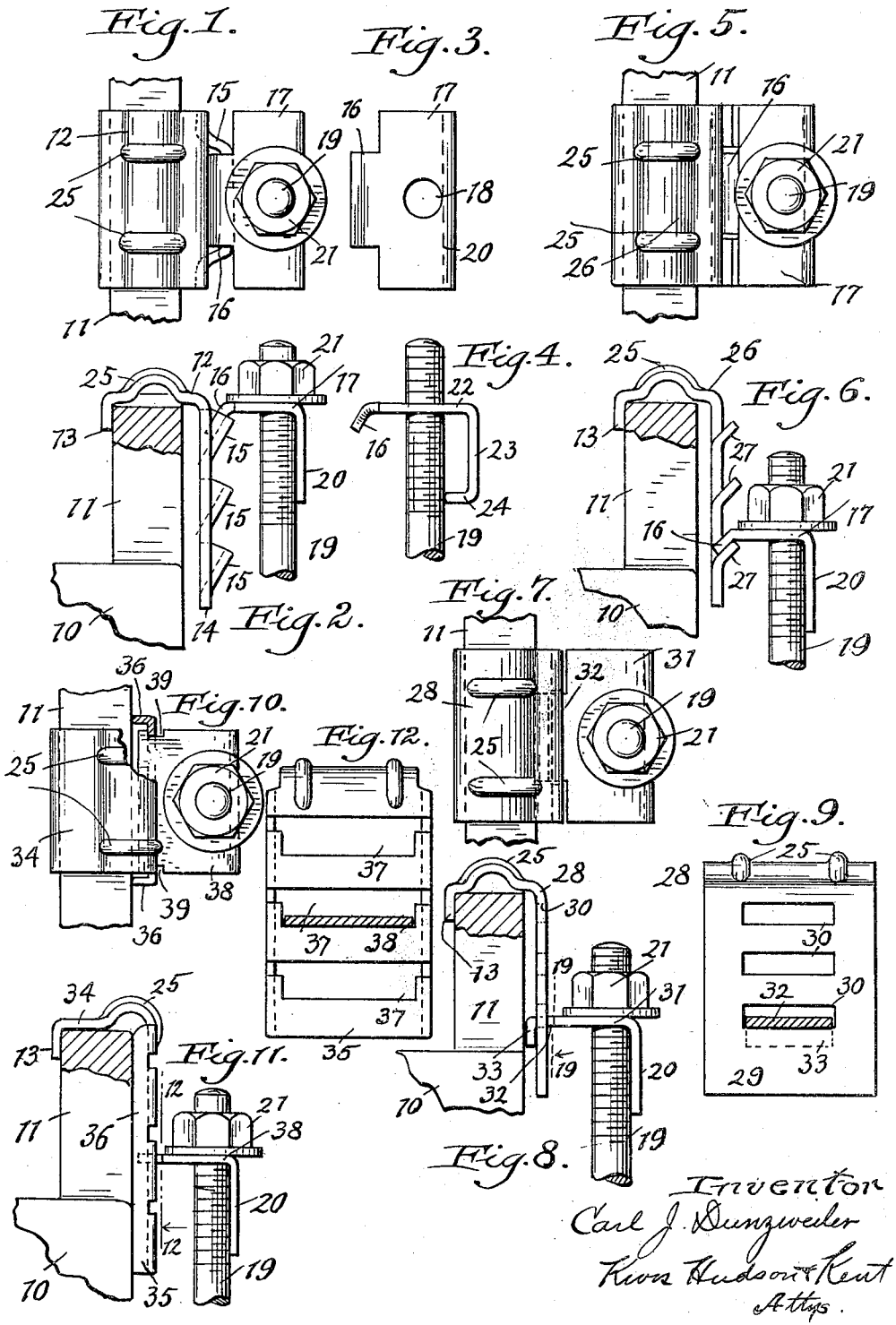

Inventor
Carl J. Dunzweiler
Kwis Hudson Kent
Attys

Patented July 19, 1932

1,867,735

UNITED STATES PATENT OFFICE

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA

BATTERY HOLDDOWN

Application filed May 27, 1929. Serial No. 366,486.

This invention relates to improvements in battery hold-downs, particularly hold-downs comprising two relatively adjustable parts whereby different batteries of varying heights may be retained in position with a given hold-down bolt.

A further object is the provision of novel means for the adjustment of two relatively adjustable parts of a battery hold-down.

Another object is the provision of means for maintaining the hook member of a hold-down in a given angular relation with the bolt, in order that the pull upon the bracket member may be maintained in the desired direction, and the breakage of battery handles, due to lateral strains, thereby avoided.

Another object is the provision of a battery hold-down made in two parts, exclusive of the hold-down bolt and nut, comprising a bracket member for connection with the battery handle and having a series of notches, and a hook member adapted to be hooked into one of such notches or pairs of notches and to transmit clamping pressure from the hold-down bolt to the bracket member.

Other objects and features of novelty will appear as I proceed with the description of those embodiments of the invention which, for the purposes of the present application, I have illustrated in the accompanying drawings, in which Figs. 1 and 2 are a plan and a side elevation, respectively, of one form of the invention.

Fig. 3 is a plan view of the hook member of the same.

Fig. 4 is an elevational view showing a modified form of the hook member.

Figs. 5 and 6 are top plan and side elevational views, respectively, of a second form of the invention.

Figs. 7 and 8 are top plan and side elevational views, respectively, of a third form of the invention.

Fig. 9 is a fragmental elevational view, partly in section upon the line 9—9, Fig. 8.

Figs. 10 and 11 are top plan and side elevational views, respectively, of a fourth form of the invention.

Fig. 12 is a side elevation of the bracket member of the same, a portion of the view being taken in section on line 12—12, Fig. 11.

Figure 13:
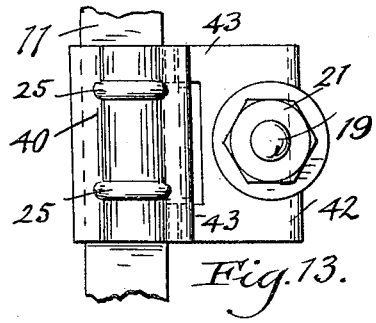
Figs. 13 and 14 are top plan and side elevational views, respectively, of a fifth form of the invention.
Figure 15:
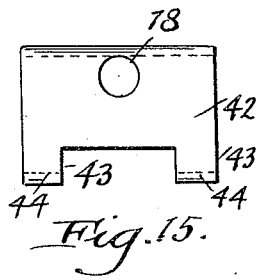
Fig. 15 is a plan view of the hook member of the same.

In the drawings a fragment of a storage battery is indicated at 10, and one of the handles of the battery at 11. The batteries produced by different manufacturers differ somewhat in size and shape, and their handles likewise differ somewhat in form and height. The changing of batteries in an automotive vehicle is called for at more or less frequent intervals, particularly for the purpose of recharging. At such times it is common practice to substitute a rental battery temporarily. The battery hold-down must, of course, be unfastened and refastened for every such change. It is therefore highly desirable to provide a hold-down of such character that it can be quickly and easily manipulated and readily adjusted to accommodate batteries of different proportions. To this end I form my hold-down in two parts, preferably metal stampings of fairly heavy gauge material, with provision for interlocking them in different relative relations, this latter provision requiring merely manual manipulation without fastenings of any kind. Such interlocking provision may be brought about in numerous ways, some of which I have illustrated herein.

Referring now to Figs. 1 to 4, inclusive, the bracket member of the hold-down is illustrated at 12. It has a horizontal portion adapted to extend across the top of the handle 11 and is provided with a downturned flange 13 to engage one side of the handle. On the side opposite the flange 13, the bracket member has a depending strap 14, out of which are pressed a series of inclined lips or stirrups 15 closed at their ends, the openings between the lips and the strap 14 constituting sockets for the reception of an inclined lip 16 on a hook member 17. This hook member is provided with a smooth bolt hole 18, in order that it may move lengthwise upon a hold-down bolt 19. The latter bolt, as found in automobiles, is usually mounted at its lower end in the battery support, and has a more or less universal connection therewith so that its upper end may be moved about to some extent. The hook member 17 has a depending flange 20 extending downwardly some little distance along the shank of the bolt 19. When the lip 16 has been inserted in the proper socket of the strap 14, a nut 21 is threaded down upon the bolt 19 and is caused to press against the hook member 17, forcing the lip 16 thereof into clamping engagement with the adjacent lip 15. Downward pressure is thus transmitted from the nut 21 to the bracket member 12. The location of the lips 15, 16 to one side of the center of the line of application of the clamping force tends to cock the hook member 17, but this is prevented by the engagement of the flange 20 with the shank or bolt 19.

In Fig. 4 I have shown a hook member 22 of somewhat modified form, having a downturned flange 23 spaced away from the bolt shank, and an inturned flange 24 for engagement with the shank. It will be understood that a similar construction of hook member might be employed in any of the other forms of the invention hereinafter described.

The top of the bracket member 12 may be pressed up to form a pair of spaced ribs 25, in order to form side abutments for special hook members provided in certain makes of automobiles, in which event the hook member 17 may be omitted.

In Figs. 5 and 6 I have shown a hook member 17 precisely like that of Figs. 1 and 2, and a bracket member 26 similar to the bracket member 12 except its inclined lips 27 are shorter and are open at the ends. The operation is substantially identical with that of the first described form.

In Figs. 7 and 8 the bracket member 28 has a strap 29 that is provided at different elevations with horizontal slots 30. The hook member 31 has a portion 32 of restricted width adapted to pass through one of the slots 30 and provided with a downturned lip 33 to engage the rear side of the strap 29 and prevent the hook member from being pulled out of the slot laterally.

Referring now to Figs. 10, 11 and 12, the bracket member 34 has a strap 35 that is provided with rearwardly extending side flanges 36. This strap 35 has a series of slots 37 therein wider at the top than at the bottom. At their widest points these slots are capable of receiving the inner flat end of a hook member 38. The latter has notches 39 cut into its sides so as to enable the hook member 38 to descend into the narrow portion of such a slot. When the hook member is in operative position in the bottom of a slot therefor, it is prevented from moving in any horizontal direction.

The modification shown in Figs. 13 to 16 inclusive comprises a bracket member 40 having pairs of notches 41 cut into its opposite edges. The hook member 42 has a pair of extensions 43 along its outer edges, each extension having a downturned lip 44 thereupon. The hook member may be slipped into any pair of notches 41 before the hold-down is connected either with the battery or the hold-down bolt, by merely causing the lips 44 to enter the notches 41 end foremost, and then rocking the hook member relative to the bracket member to bring the parts into the position illustrated.

Figure 17:
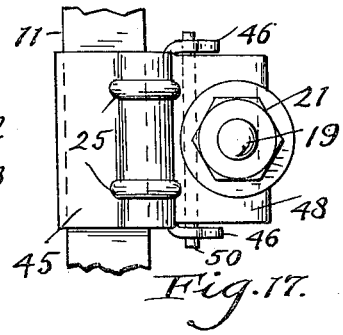
Figs. 17 and 18 are top plan and side elevational views, respectively, of a sixth form of the invention.
Figure 14:
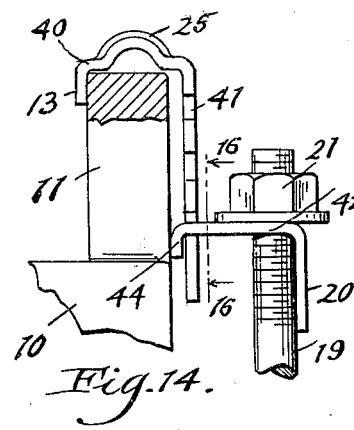
Figure 16:
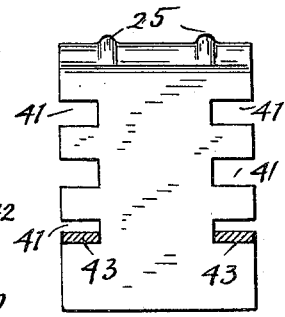
Fig. 16 is a side elevational view of the bracket member shown in Figs. 13 and 14, the view being partially in section on the line 16—16, Fig. 14.
Figure 18:
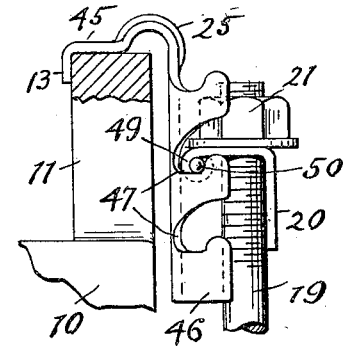

In Figs. 17 and 18 there is shown a bracket member 45, the depending strap of which is flanged outwardly on each edge, as indicated at 46, each of these flanges being provided with inwardly and downwardly extending curved slots 47, the slots of one flange being arranged directly opposite those of the other flange. The hook member 48 of this modification is turned over at one edge to form an elongated eye 49 in which I mount a pin 50 that extends outwardly beyond both lateral edges of the hook member and engages in any one of the different pairs of slots 47.

Figure 19:
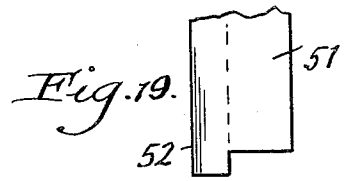
Fig. 19 is a fragmental top plan view of a modified form of hook member for use in connection with the modification illustrated in Figs. 17 and 18.
Figure 20:
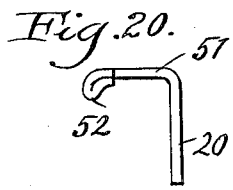
Fig. 20 is a side elevation of the same.

Instead of an eye 49 and a pin 50 I may merely roll under upon itself one edge of a hook member 51, giving this rebent portion a downward inclination, as shown in Fig. 20. I form thereby a reinforced lip 52, and as shown in Fig. 19 this lip extends laterally beyond the main portion of the hook member so as to engage in the slots 47 in the same manner as does the pin 50.

Figure 22:
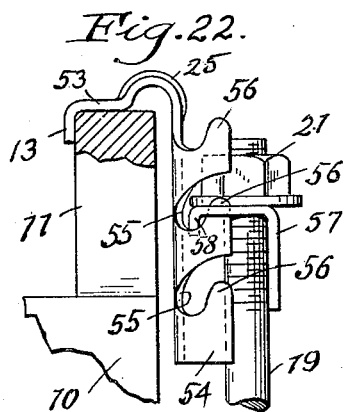
Figs. 21 and 22 are top plan and side elevational views, respectively, of a seventh form of the invention.
Figure 23:
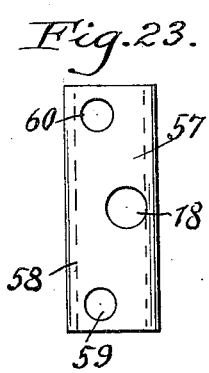
Fig. 23 is a top plan view of the hook member of Figs. 21 and 22.
Figure 21:
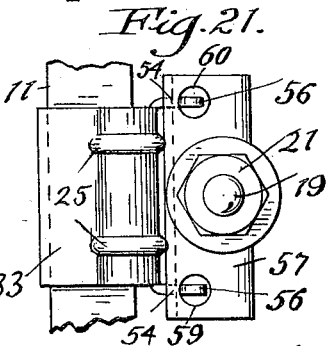

The form of the invention illustrated in Figs. 21, 22 and 23 is similar to that of Figs. 17 and 18, the bracket member 53 having side flanges 54 with curved slots 55 substantially identical with the corresponding parts in Figs. 17 and 18. The formation of the slots 55 leaves upstanding projections 56 in the edges of the flanges 54. Hook member 57 is formed with a short downturned flange 58 which rests in the bottoms of the slots 55, while holes 59 and 60 in the top of the hook member receive the projections 56, whereby the bracket and hook member are held against relative lateral movement.

While in the foregoing description and in the accompanying drawings I have disclosed several forms of the invention more or less in detail, I desire it to be understood that such detailed disclosure is primarily for the purpose of fully illustrating the invention, and is not to be construed as amounting to a limitation upon the scope thereof.

Having thus described my invention, I claim:

1. In a battery hold-down, a bracket adapted to engage a battery, a hook member adapted to be loosely mounted upon a hold-down bolt, cooperating means upon said bracket member and hook member providing selective engagement between said members at different relative positions thereof, said hook member having a portion thereof extending along said bolt for maintaining the hook member in a given angular relation with the bolt.

2. In a battery hold-down, a bracket adapted to engage a battery, a hook member having an opening therethrough adapted to loosely receive a hold-down bolt, cooperating means upon said bracket member and hook member providing selective engagement between said members at different relative positions thereof, said hook member having a portion thereof adapted to bear upon said bolt at a point spaced from said opening for maintaining the hook member in a given angular relation with the bolt.

3. In a battery hold-down, a bracket adapted to engage a battery, a hook member adapted to removably engage said bracket, said hook member having an opening therethrough adapted to loosely receive a hold-down bolt, said hook having a portion thereof adapted to bear upon said bolt at a point spaced from said opening for maintaining the hook member in a given angular relation with respect to the bolt.

4. In a battery hold-down, a bracket adapted to engage the battery, said bracket having a series of vertically spaced sockets, a hook member adapted to engage selectively any one of said sockets, said hook member having an opening therethrough adapted to loosely receive a hold-down bolt, said hook member having a portion thereof adapted to bear upon said bolt at a point spaced from said opening, for maintaining the hook member in a given angular relation with respect to the bolt.

5. In a battery hold-down, a bracket adapted to engage a battery, said bracket having a series of spaced sockets, a hook member adapted to engage selectively any one of said sockets preventing relative movement of said members away from each other, said hook member having an opening therethrough adapted to loosely receive a hold-down bolt, said hook member having a portion thereof adapted to bear upon the side of said bolt remote from said bracket at a point spaced from said opening, whereby said hook member is maintained in a given angular relation.

6. In a battery hold-down, a bracket adapted to engage a battery, said bracket having a series of vertically spaced sockets, a hook member having a portion adapted to be projected into one of said sockets, said portion having a downturned extremity thereon, said hook member having an opening therethrough adapted to loosely receive a hold-down bolt, said hook member also having a portion thereof adapted to bear upon the side of said bolt remote from said bracket at a point spaced from said opening, whereby said hook member is maintained in a given angular relation.

7. In a battery hold-down, a bracket adapted to engage a battery, said bracket having pressed therefrom a series of inclined stirrups and a hook member adapted to be loosely mounted upon a hold-down bolt, said hook member having a downwardly inclined lip adapted to be selectively received in any one of said stirrups.

8. In a battery hold-down, a bracket adapted to engage a battery, said bracket having a pair of upstanding side flanges having inclined slots, and a hook member adapted to be loosely mounted upon a hold-down bolt, said hook member having a down-turned portion adapted to engage selective pairs of said inclined slots at different relative positions of said bracket and hook member.

9. A battery hold-down comprising a bracket member adapted to engage a battery, said bracket member having a depending portion with a seat thereon, and a hook member adapted to be engaged by a hold-down bolt, said hook member having a portion adapted to engage said seat and having a depending flange adapted to engage the shank of the hold-down bolt.

10. A battery hold-down comprising a bracket member adapted to engage a battery, said bracket member having a depending portion with a seat thereon, and a hook member adapted to engage said seat and having a portion adapted to be engaged by a hold-down bolt, and a depending portion adapted to engage the shank of the hold-down bolt at a point spaced from the point of contact between said bolt and said first named portion.

In testimony whereof, I hereunto affix my signature.

CARL J. DUNZWEILER.